United States Patent [19]

Dirscherl et al.

[11] Patent Number: 5,001,348
[45] Date of Patent: Mar. 19, 1991

[54] METHOD AND APPARATUS FOR RECOGNIZING THE START AND MOTION OF OBJECTS

[75] Inventors: Reinhard Dirscherl; Ernst-August Seiffarth, both of Taufkirchen; Georg Voetterl, Heufeld, all of Fed. Rep. of Germany

[73] Assignee: Messerschmitt-Boelkow-Blohm GmbH, Munich, Fed. Rep. of Germany

[21] Appl. No.: 397,718

[22] Filed: Aug. 23, 1989

[30] Foreign Application Priority Data

Aug. 25, 1988 [DE] Fed. Rep. of Germany ....... 3828766

[51] Int. Cl.$^5$ .............................................. G01N 21/71
[52] U.S. Cl. .................................. 250/372; 250/339; 358/109
[58] Field of Search ................. 358/108, 109, 110; 250/372, 373, 339; 244/3.13, 3.16; 102/213

[56] References Cited

U.S. PATENT DOCUMENTS

| | | | |
|---|---|---|---|
| 3,053,932 | 9/1962 | Worst | 358/110 |
| 3,931,462 | 1/1976 | Exton | 250/373 |
| 4,458,266 | 7/1984 | Mahoney | 358/108 |
| 4,639,774 | 1/1987 | Fried | 358/109 |
| 4,765,244 | 8/1988 | Spector et al. | 102/213 |

FOREIGN PATENT DOCUMENTS 3014906  10/1981  Fed. Rep. of Germany .

OTHER PUBLICATIONS

Weiser et al, "Sensitive Far UV Spectrograph with a Multispectral Element Microchannel Plate Detector for Rocket-Borne Astronomy", Appl. Optics; 1S (2), Dec. 1976, pp. 3123-3130.
"Electro-Optic and Infrared Sensors", by John J. May, Jr. et al, Microwave Journal, Sep. 1983, vol. 9, pp. 121, etc. 126, 127, 130, 131.

Primary Examiner—Carolyn E. Fields
Attorney, Agent, or Firm—W. G. Fasse; D. H. Kane, Jr.

[57] ABSTRACT

A recognition system for alarming and early warning against starting and approaching flying objects with an active engine evaluates the "plume signature" of such an engine. Image signal generating electro-optical sensors, which operate in a preselected spectral range, are combined with an image processing and evaluating arrangement for producing output signals that can initiate countermeasures semi-automatically or automatically after a threat analysis has established that a threat exists.

24 Claims, 9 Drawing Sheets

Fig. 5a
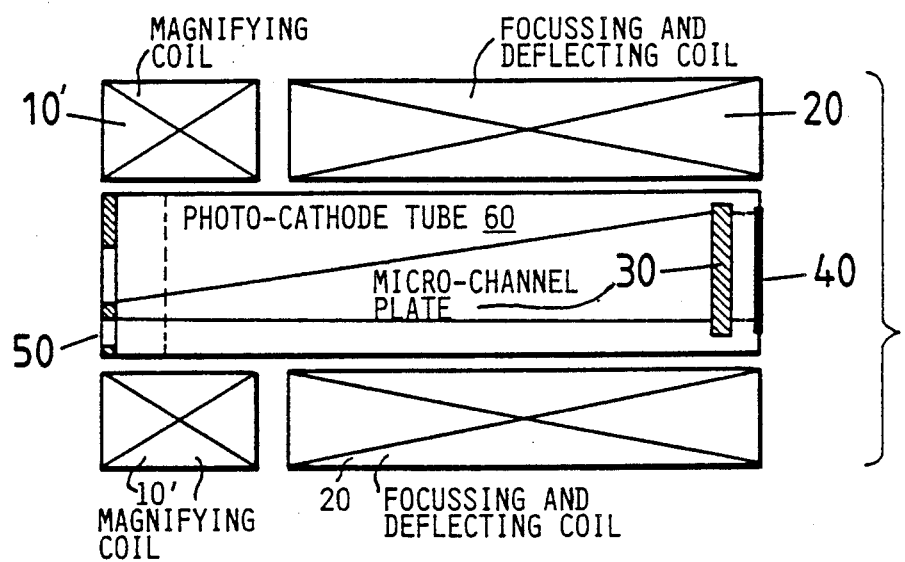
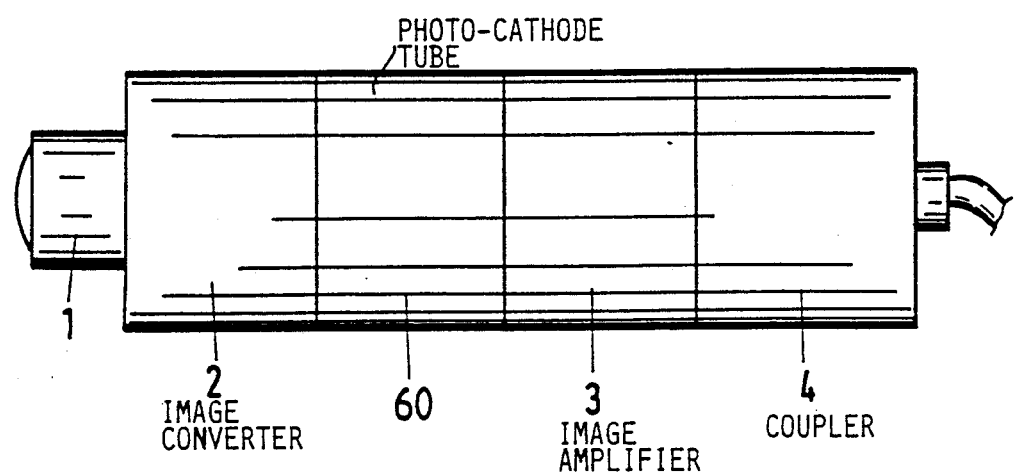
FIG. 5b

METHOD AND APPARATUS FOR RECOGNIZING THE START AND MOTION OF OBJECTS

CROSS-REFERENCE TO RELATED APPLICATION

The present application is related to copending Ser. No. 07/397,719, filed in the U.S.A. on Aug. 23, 1989, and entitled: "METHOD AND APPARATUS FOR STEERING MOVING OBJECTS", assigned to the same Assignee as the present application.

FIELD OF THE INVENTION

The invention relates to a method and an apparatus for recognizing the start and the motion of objects such as threatening weapons systems.

BACKGROUND INFORMATION

Mainly two search and recognition principles have been known heretofore:

(a) Passive

For searching and recognizing a flying body, radiation detectors have been used which operated in the visible and in the infrared spectral ranges for recognizing a target. An example of such a passive target search arrangement is given in the German Patent Publication 3,014,906. The operating principle described therein is, however, limited to a series or row arrangement of detectors and to the sampling or scanning thereof one after another in sequence. The number of usable single detectors is limited in such an arrangement, and the manner of target searching as well as the evaluation is made more difficult by time comparison and delay elements.

(b) Active

Active systems are, for example, radar systems, or in general such systems in which electromagnetic radiation is transmitted out and the reflected radiation of a flying object illuminated in this manner, is received by appropriate sensors and analyzed. The sensors are also called electro-optical sensors, see for example, Microwave Journal, September, 1983, Nr. 9, page 121 et seq. The disadvantage of such a system is that its prominent characteristic emission can be detected by the enemy.

OBJECT OF THE INVENTION

It is the object of the invention to provide an electro-optical recognition system which operates with a high reliability against interference effects and which has a large operating range.

SUMMARY OF THE INVENTION

According to the invention there is provided a system for recognizing the start and the approach flight of a flying body by evaluating the so-called "plume signature" which is generated by the exhaust. For this purpose a radiation detector having a determined spectral range produces electronic signals which are processed for evaluation. The sensor has a sensing surface area responsive to UV radiation. The output signals from the UV sensor pass through an image read-out unit which is connected with its output to an image processing stage, including a computer which compares the image signals with stored previously known patterns of a determined spectral or "plume signature" for a reliable recognition and/or a plausibility control.

The surface area UV sensor preferably produces the image signals in binary form (light/dark) and senses the UV radiation through input optics, followed by image converter means, image amplifier means, and said image read-out unit, for providing electronic image information which is supplied through an interface to said image processing stage operating as a digital image processing and image evaluating stage, and wherein the useful signals produced by this stage are conveyed through further interfaces to an indicator unit or are used for activating countermeasures.

The most essential advantages of the invention are: the reliable identification of flying bodies at a great distance can be used in a warning or alarm system for making a threat analysis and, if necessary, to derive therefrom semi- or fully automatic countermeasures.

By detecting the self- or characteristic-emission of the flying body exhaust gas stream, referred to herein as the "plume signature", in the ultraviolet spectral range with sensor devices which are blind to artificial and solar UV, light and heat sources, the system according to the invention is considerably more reliable against interference than the known infrared warning systems which can be deceived by other types of thermal radiation sources or by thermal radiation sources located at different locations.

In the invention the usable signal as it is detected by the sensor, already exists in a quasi-binary form, for example in the form of light or gray relative to the homogeneously dark background. By using a surface sensor with a high pixel count, an optimal background suppression with a high location or ranging resolution is achieved without a moving scanner.

The recognition system according to the invention serves for identifying, tracking, calculating approach flight coordinates, and warning against certain flying bodies with an active engine, especially rockets, jets or other reaction propulsion or jet stream engines or also projectiles with, for example pyrotechnic compounds and a plume tail or fire flash, flame or similar manifestations of ignition or combustion. The warning against such an actively attacking flying body is achieved by means of a passive electro-optic imaging system having a high location and temporal resolution which recognizes the approaching flying body without errors in a special wave length range (solar blind), wherein the imaging system is coupled to an image processing system for allowing optimal countermeasures to be commenced in quasi-real time.

In the recognition system according to the invention, a spectral image conversion from the ultraviolet range into the visible range has especially proven itself during a simultaneous electro-optical amplification with an electronically controllable exposure and read-out of the image information by a CCD-chip which provides this information in electronic, preferably digital, form at an interface of the image processing stage.

It is especially advantageous to use a micro-channel plate for the electro-optical part of the recognition system with a high spacial or location resolution. A further advantage is provided by the simultaneous electron multiplication (factor $>10^4$), whereby a photo-cathode may be arranged at the input side of the multiplier tube and a phosphorescent coating or another fluorescent screen is provided at the output end for the image formation. A direct coupling of the CCD to the output of the micro-channel plate is also possible. It is advantageous to use one or more filters in front of the photo-cathode, whereby the filters narrow, as desired, the spectral range to be evaluated. The achievable resolution of the electro-optics is at more than 30 1 p/mm.

It is a further advantage of the invention to use an electronic short time exposure by means of which the signal to noise ratio may be improved when using an amplification having a sufficiently large dynamic range, whereby the operating range or distance may be increased and an improved imaging quality and a stabilization of the image information are achieved.

It is especially suitable to use clocking for achieving the electronic exposure, that is to say, an electronically controllable timing or time duration for producing pulse-shaped timing signals. Heretofore one uses, for example, trigger signals, pulse width modulation, period duration, frequency modulation, or counting of a clocking cycle within a prescribed time window and the like. For simultaneously clocking several components, the time duration and switch-on time of the separate components must be matched to one another.

The time duration and the time points of the above mentioned exposure of the individual components may be still further improved by the coupling to a light sensor, an oscillation sensor, or a position or acceleration sensor. In this context, the improvement refers to reliability of the recognition or identification.

When using a sensor with a rotating mirror arrangement or using and combining several sensors in a manner still to be described below, the field of view or sight field of the recognition system may be enlarged up to a panoramic view. For applications in space, for example, on satellites, the combination of the large operating range with the high temporal and spacial resolution is especially advantageous while atmospheric extinction is avoided.

BRIEF DESCRIPTION OF THE DRAWINGS

In order that the invention may be clearly understood, it will now be described, by way of example, with reference to the accompanying drawings, wherein:

FIG. 5a shows an arrangement of an electro-optical zoom;

FIG. 5b illustrates the installation of the electro-optical zoom into the electro-optical part of the recognition system including an image converter and an image readout;

DETAILED DESCRIPTION OF PREFERRED EXAMPLE EMBODIMENTS AND OF THE BEST MODE OF THE INVENTION

Figure 1:
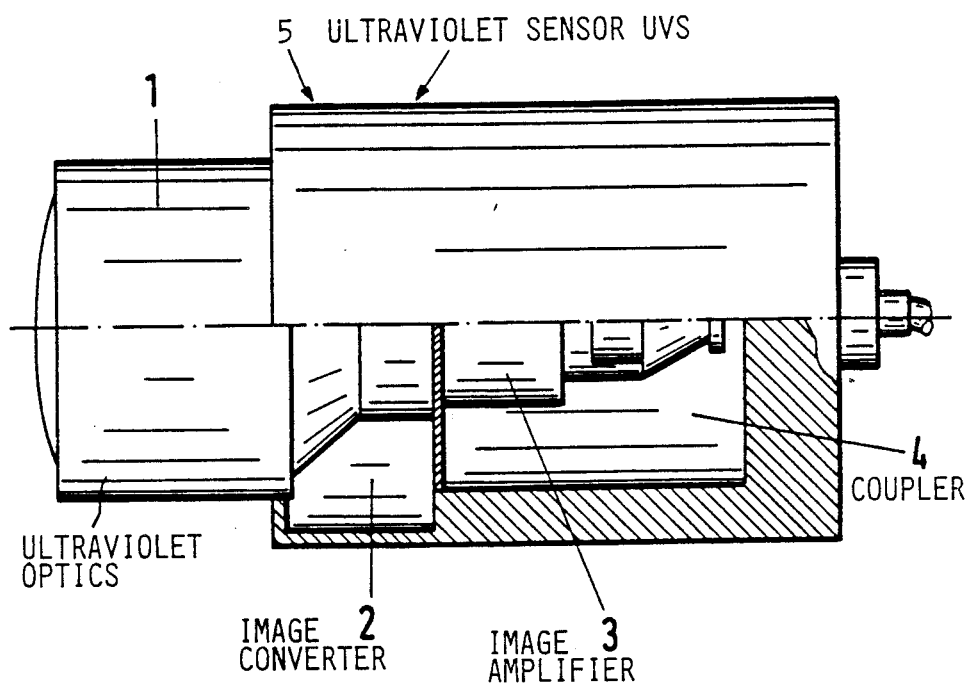
FIG. 1 shows an ultraviolet sensor of the recognition system partially in section.

FIG. 1 shows the ultraviolet sensor UVS with its most important components including the ultraviolet optics 1, an image converter 2, which converts the light from the ultraviolet to the visible spectral range, an image amplifier 3, and a coupler 4 which couples the image amplifier 3, for example by means of a fiber coupler, to a CCD-chip and to the image evaluating stage.

The new UV Sensor according to the invention has a much lower detector noise than, for example, known IR detectors. Known IR detectors must be cooled and are to be sampled individually, which requires complex and movable parts which are not sufficiently shock-resistant.

IR images have less contrast and are fuzzier than UV images due to the wave lengths which are larger by up to a factor of 50, which also requires proportionally larger input optics. Furthermore, infrared sensors have a high background noise because the Plank's radiation of the normal ambient temperature (300K) has its maximum at 10 microns. Known IR focal plane array detectors are still very expensive, and in resolution they are far below the image sensors in the ultraviolet wave length range. As mentioned, they must be cooled and only comprise a small dynamic working range. Deception devices with a high intensity in the IR window are easy to produce, e.g. in the form of flares. The operating range of infrared detector systems is also limited by atmospheric extinction.

By using the UV sensor according to the invention, for example, according to FIG. 1, an early warning system may be provided which is optimally employable in space and which warns against enemy active flying bodies which may be unambiguously identified with a low false alarm rate. The described UV sensor not only allows the plume of the exhaust gas stream of the flying body to be recognized, but it also permits getting evidence or data about the type of the flying body and its flight direction which may then be tracked. The direction of the approach flight can result from the known or expected origin by means of coordinate determination, the type of flying body can be determined by means of comparison with previously known stored data for reaction propulsion thrust engines, whereby, for example, the size, such as the diameter of the exhaust gas stream, its length, its spectral lines, or its spectral wave length range, and/or color temperature can be recognized.

The UV sensor according to the invention has a high dynamic range and a high operating range including for viewing directions toward the sun due to the provision of anti-blooming. The construction of the UV sensor without movable parts and without cooling, mounted in a common housing with the optics, avoids shock-sensitivities. EMP (electromagnetic pulse) resistance can be increased by a glass fiber signal line between the UV sensor and the image processing section, whereby the sensor is located on the surface and the image processing section and the electronics are located in the protected inner part of the weapons system, for example, a helicopter or aircraft.

By means of a time-correlation on-line with the information flow from the recognition system, not only can a warning or alarm be produced, but countermeasures optimal as to time, local and quantity can take place after the recognition of an enemy flying body from its origin, its approach flight direction, approach flight velocity, and/or the type of its engine. The decision regarding the countermeasures is preferably achieved according to a thread analysis carried out in quasireal time, especially regarding which flying body is flying at which velocity from which starting locations in which direction, and the response to the threat can take place immediately, for example, by guiding a defensive flying body which is to be steered against the approaching flying body and which, by means of the coordinate system inherent in the recognition system, is brought into the corresponding appropriate defensive position and, as required, into the defensive flight path. A central computer connected to the warning system, could, however, also precalculate the flight path of the attacking active flying body and initiate an evasive maneuver and/or calculate and commence a timely localized and quantitative application of a defense, depending upon how and where a destruction or neutralization of the approaching enemy flying body is planned.

Figure 2:
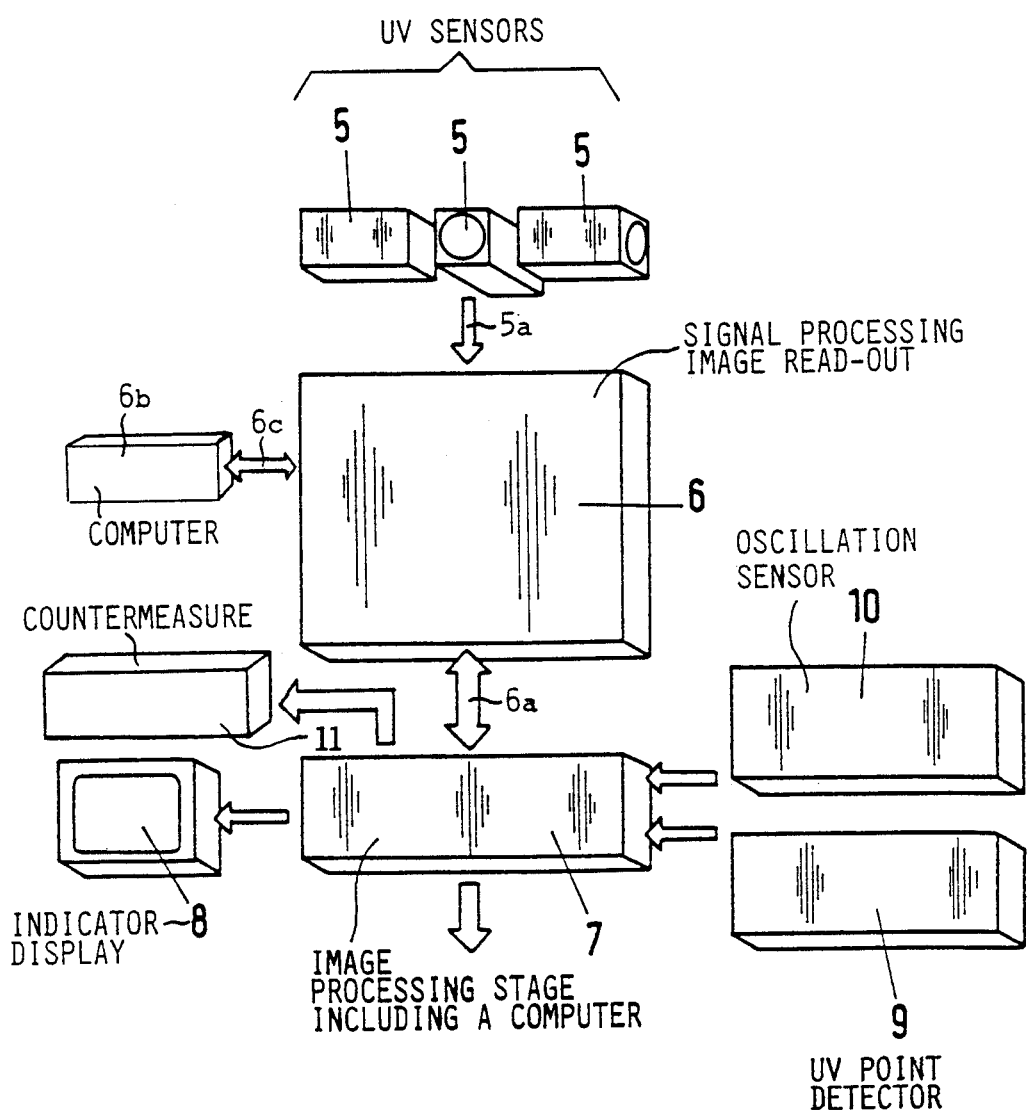
FIG. 2 shows the main components of a flying body warning system with sensors according to FIG. 1.

FIG. 2 shows three UV sensors 5 which together are arranged relative to one another so that they allow a view angle of 360°. As further shown by the block circuit diagram of FIG. 2, the UV sensors 5 are connected by a data bus 5a with a signal processing stage 6 which is connected through a data bus 6a with the image processing stage 7 and with a computer 6b through a data bus 6c. The stage 7 includes a computer, which may be embodied separately from stage 7. Stage 7 with its computer is optionally connected with an indicator or display 8, a UV point detector 9, and/or further sensors such as oscillation sensors 10 and a stage 11 for the eventual triggering of countermeasures. The sensor is connected to an image memory and is controlled by means of clocking and zooming. The stage 6 is connected with its analog-digital output by bus 6a to the image processing stage 7 and the computer in stage 7. The computer in which the threat analysis is carried out may on the one hand be connected with an indicator and operating unit 8, preferably a color monitor with a keyboard, on which a threat is indicated and a menu of countermeasures is provided. Depending upon the threat and the circumstances, manual countermeasures may be initiated. However, it is preferably to use menu controlled semi-automatic and automatic, optimal countermeasures in quasi-real time according to stored programs of the defensive measures at hand and with the aid of activators which activate the countermeasures and also controlled by the computer of the image processing stage 7 of the recognition system or by a different computer such as a central computer appropriately connected.

The passive electro-optically imaging part of the recognition system according to the invention has at its disposal wide angle input optics with a spectral transmission which images the field of view onto a light sensitive surface the photo-cathode in a wave length range over, for example 200 nm. The image information present on this surface is transformed from the ultraviolet to the visible wave length range (green) by the image converter 2 shown in FIG. 1 and is amplified in intensity by means of the image amplifier 3 with as little distortion as possible, transmitted further and read out, for example, by a taper fiber coupled CCD-chip forming the coupler 4. The signals representing the image information pass through stage 6, which transmits these signals in the form of video images to the image processing stage 7. If no flying body is located in an approach flight, then the image processing results in a homogeneous dark image because there are no UV radiation sources.

If the UV plume of an exhaust gas stream of a flying body enters the field of view of the recognition system, this plume arises in the video image as a bright light spot in the wavelength UV range for which the recognition system according to the invention is provided. The image processing stage 7, which is known as such, now alters the image information of the video image in such a manner that the flying body is still better recognizable relative to the background, that is to say, it improves the image, corrects image errors, etc.

The change of coordinates during the approach flight of the flying body within the field of view of the sensors 5, is registered in quasi-real time and the signature of the exhaust gas stream is evaluated and recognized with reference to its size, intensity, shape, center of gravity, direction, and continuity. Thereby, false alarms and possibilities of deception are largely prevented in that one compares the flight path progression, brightness and surface increase and other typical plume characteristics detected by the sensor with the stored characteristics of known patterns which correspond to the typical behavior of flying objects.

Several UV sensors 5 having an overlapping field of view can panoramically view the flying body or object once it is recognized, without tracking the optics. The lens system with a combination of suitable materials, is selected in its optical quality for the imaging, in such a manner, that the image information is imaged with a high quality over the entire wave length range, which might be viewed, and that the image on the photo-cathode is better or as good as the following electro-optical amplification and imaging (for example 1 p/mm, transmission, aperture, field of view size, distortion).

In the light optical part of the recognition system, one or more filters for the wave length specific selection of the light incident from the field of view are arranged in such a manner, that the UV signature of the rocket plume is optimally transmitted with a maximum filtering (absorption) of all other wave lengths of any light present. The application of filters can be carried out with a light background (day application) or even better with a relatively dark background (night application). For the night application the filtering may possibly be left out if the background noise does not come into play. A special photo-cathode, for example, made of CsI, RbTe or CsTe, can also be used which is only sensitive in the UV spectral range, or a wide band (200–1000 nm) sensitive photo-cathode, for example, bi-alkali, GaAs, all in combination with suitable filters.

The electro-optical part 5, 6 provides a video signal to the image processing stage 7 with a computer and a suitable interface. Video signals are preferred which are produced by operating a sensor by means of clocking or zooming, that is to say the exposure and the field of view of the sensor are electronically controlled. If the electro-optical part 5, 6 comprises several clockable components, then the time duration and switch-on point of the separate components must be matched to one another. Such sensors are, for example, image converters, image amplifiers, or SIT-tubes, silicon intensified target, compare FIGS. 5 and 6. Suitable for this purpose are image converters of the near focus type (proxifier) with a respective photo-cathode, an amplification stage with a possibly cascaded image amplifier, and an image read-out directly coupled or via an imaging optics or taper fiber coupling to CCD chips with sufficient resolution and dynamic range, for example as distributed by the company Dalsa, Inc., Canada under the protected trademark PHOTOFET.

Figure 3:
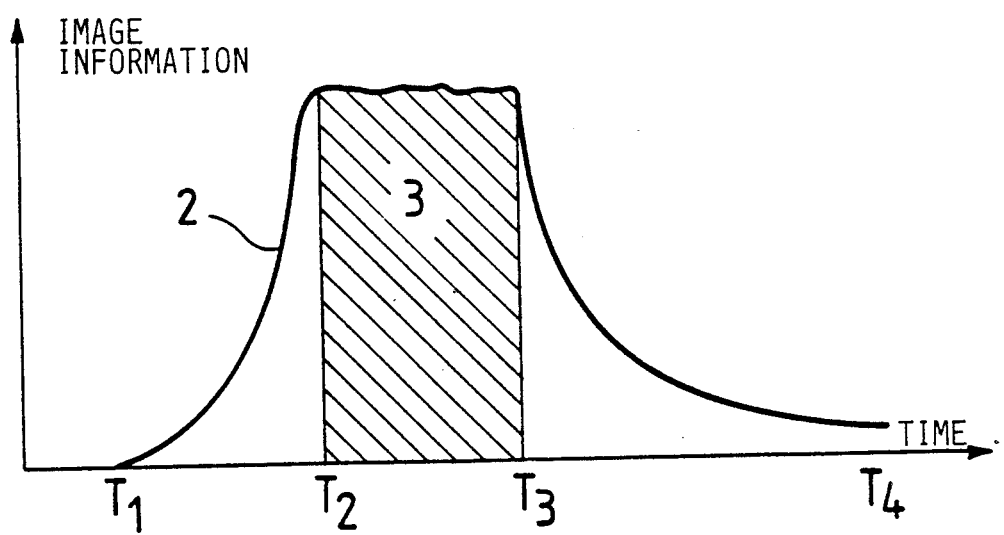
FIG. 3 is a curve of an image evaluating scheme with a controllable (closed loop) exposure time.
Figure 4:
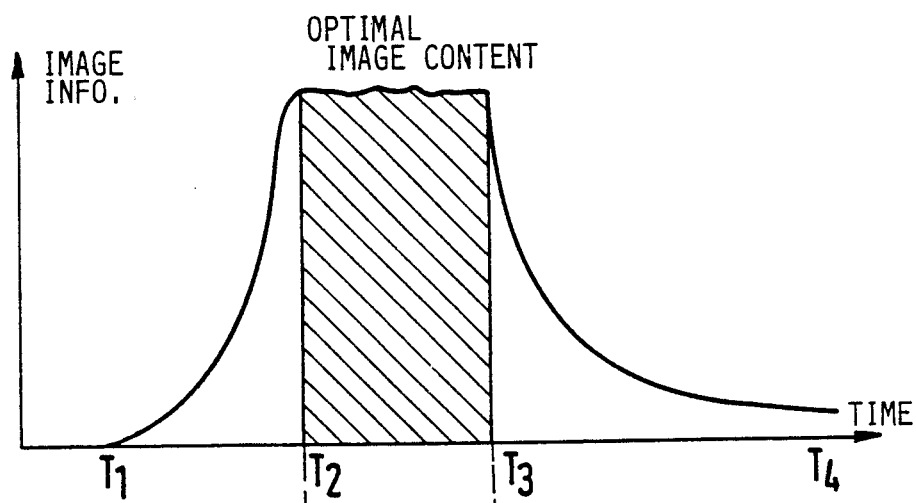
FIG. 4 illustrates a combination of the evaluation of the usable signals of the UV sensor with reference to the upper curve and of a vibration sensor with reference to the lower curve.
Figure 4:
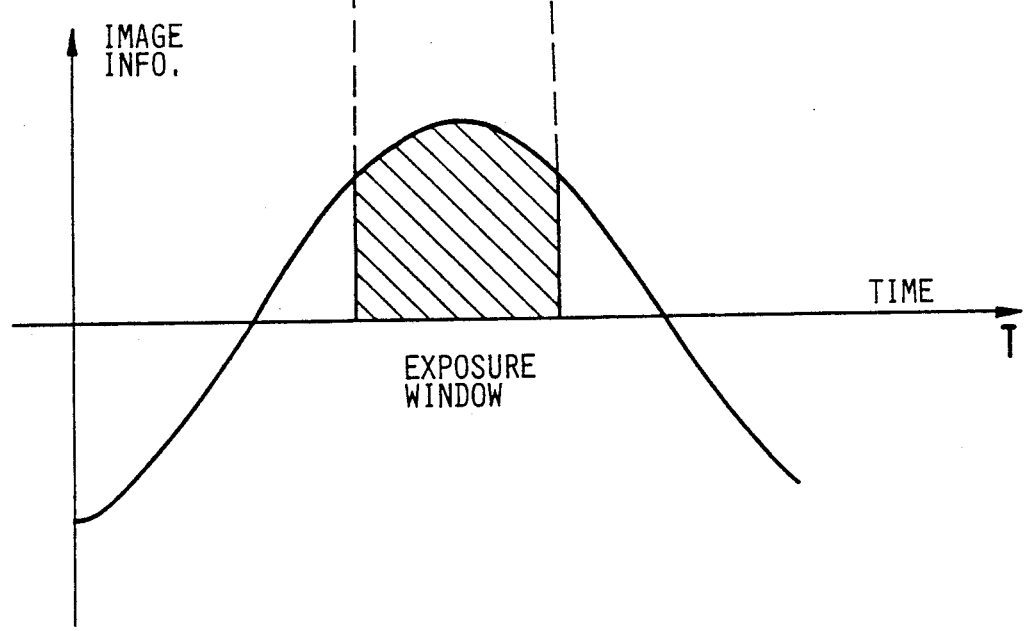

Due to the available large dynamic range, the electronic short time exposure achieves an operating range increase and an improved image quality with a very quickly progressing image process, freezing in the micro to nanosecond range, and thus a simplified image processing as shown in FIG. 3. In this context, the exposure time is set by the image converter 2 and image amplifier 3 in such a manner, that an image content only exists between the exposure time $T_2$ and $T_3$ in order to optimize the image information. A stabilization of the image information regarding a shaking distortion, is achieved by coupling the exposure time to an additional oscillation sensor as shown in FIG. 4, wherein the relationship between the optimum opening time of the exposure $T_2$ to $T_3$ of the UV sensor 5 can be seen at the top, and the oscillation behavior of the vibrating sensor 10 can be seen at the bottom. The vibrating sensor 10 is optionally shown in FIG. 2. The same is true for a UV point detector 9 which additionally offers protection against blinding glare or damage due to a strong incident radiation intensity.

The exposure times can be reduced into the nanosecond range for the image amplifier.

The image converter is activated, for example, at the time $T_1$. The following stage, for example the image amplifier BIV, is activated at $T_2 > T_1$, because the first stage has a rise slope and a decay slope in which the image content is not optimal. Due to the shorter image amplifying phase $T_2$ to $T_3$ within the active time window of the image converter $T_1$ to $T_4$ the rise slope and the decay slope are cut off, whereby an increased operating range is achieved with a background limitation. The UV signature of a fast moving flying body is blurred within the field of view (image field) due to the large relative velocity. The flying body signature can travel through a large portion of the image field during an exposure time of, for example 20 ms, and is therefore difficult to analyze. On the other hand with short time exposures, these values can be evaluated, for example, by means of the described clocking thereby enabling the recognition of the flying body. The same is true for the case of a moving recognition system. In this case the image information would be blurred without clocking The control of the clocking can be carried out according to FIG. 4 by means of an oscillation sensor 10, position sensors, or acceleration sensors. Such sensors as for example piezoelectric sensors, are available in the trade, are very small and light, and give off a signal which is proportional to the acceleration, be it due to vibration of the device on which they are located, or due to tilting of the sensor itself. This signal is amplified and is supplied in the form of an alternating voltage ready for use in the evaluation. Vibrations, which, for example arise from the sensor platform, are typically registered by an oscillation sensor 10, for example, in the form of a sinusoidal curve which possibly can be smoothed by means of known filters. For the clocking it is decisive that a window is chosen for the exposure, see FIG. 4, between $T_2$ and $T_3$ within the sinusoidal oscillation which causes an interference. The switch-on window $T_2$ to $T_3$ should be as large as possible and should be subject to as few direction changes as possible within this active time.

According to the bottom part of FIG. 4, in the abstracted case of a sinusoidal oscillation, the window can be held open at every $\lambda/2$ wave length with its time midpoint at the minimum/maximum passage of the sinusoidal signal of the additional sensor. How far the window can be extended around the minimum/maximum point of the sinusoidal curve, can be easily experimentally determined. In the case of a nonsinusoidally shaped vibrational interference, the signal characteristic can be prepared, for example by means of filtering, FFT or the like before the feed-back coupling with the shutter time.

When using the recognition system with an exposure time control provided by the acceleration sensor, other phenomena varying quickly can also be better monitored, because in this context it becomes possible to achieve an image stabilization for any type of moving camera guidance, that is to say, always then when it is important to free the image content of any local oscillations. This is also generally useful for robot installations.

Instead of the clocking, or in addition thereto, an electronic field of view variation (zoom) according to FIG. 5 may also be used.

The electro-optical zoom part 60 may be arranged, just as the image amplifier 3, in series and between the image converter 2 and the CCD-read-out, or it may be integrated, for example, as an integrated electro-optical component. If one varies the field of view size by zooming within the available time, the result is an increase in the validity of the information - here the recognition reliability. When identifying ultraviolet radiation sources in the panoramic view mode, these UV sources must be viewed individually and unambiguously identified by enlarging the small UV event or occurrence. If a flying body is not identified, the next UV radiation source is taken into close scrutiny or view as described above and is processed, etc. until all UV light sources in the field of view have been examined. If a flying body is identified the body is to be tracked and its threat is to be analyzed. If the field of view variation is carried out continuously, then the electro-optical zoom is in a condition to vary and centrally depict any desired portion of the field of view within defined edge boundary requirements.

An example embodiment with an electronic zoom is shown in FIGS. 5a and 5b, wherein only a portion of the first image field plane is projected or imaged onto the following image field plane (phosphor) by applying appropriate electromagnetic fields. A magnifying or enlarging coil 10' is arranged around a photo-cathode 50 at the radiation input of a photo-cathode tube 60, and behind the magnifying coil 10' focusing and deflecting coils 20 are arranged around the tube 60 for electron multiplication. A micro-channel plate 30 is arranged within the tube 60 and a phosphorescent disk 40 functions as the radiation output. The electro-optical zoom arrangement of FIGS. 5a and 5b achieves an increase in the location and intensity pick-up by varying the applied electromagnetic fields. The electronic switch-on and switch-off times are possible into the ms range, similarly as for the clocking. Preferred times for the switch-on and switch-off of the field of view variations are in the range of the exposure time of several images, that is to say in the range of approximately 50 ms. The duration of the enlargement or magnification is dependent upon the time which is required for the analysis by means of the image processing.

Figure 6A:
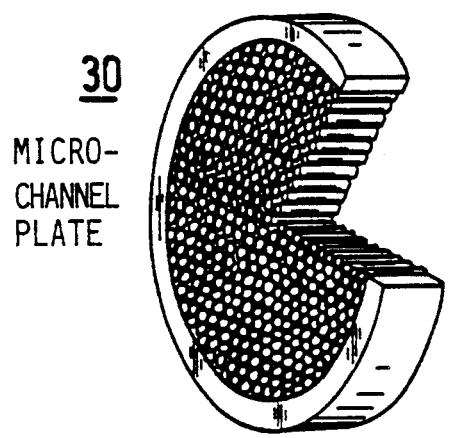
FIG. 6a shows a micro-channel plate.
Figure 6B:
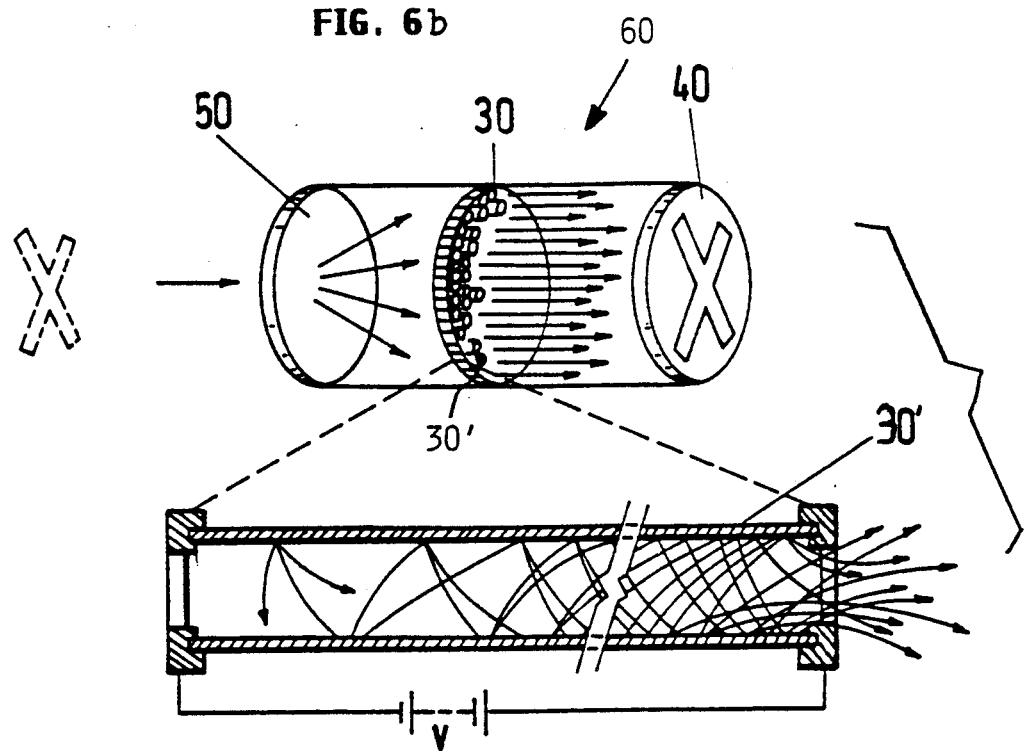
FIG. 6b shows a perspective view of an electron multiplier tube with a micro-channel plate as shown in FIG. 6a and a lengthwise sectional view of a single micro-channel for explaining the functional principle thereof.

FIGS. 6a and 6b show further details of the photo-cathode tube 60 with its photo-cathode 50, its micro-channel plate 30 and its phosphorescent disk 40. One of the micro-channels 30' of the micro-channel plate 30 is shown on an enlarged scale in the lower part of FIG. 6b.

Instead of, or in addition to, the electro-optical zoom, a signal to noise ratio improvement can be achieved by means of zooming in the image processing part of the recognition system. Thereby, the validity of the information of the image content may be improved by appropriate algorithms with sub-pixel calculations.

The recognition system of the invention can be used not only in the ultraviolet, but also in the visible range, and in the infrared near to this spectral range (200 nm to approximately 1000 nm). In this variation of the invention, the above described photo cathode 50 is replaced by another one which is sensitive in the desired expanded spectral range, for example bi-alkali, S20, GaAs cathodes may be used. In this manner, the recognition system of the invention becomes a multi-spectral sensor. By means of a filter disk with appropriate filters arranged in front of the photo-cathode and mechanically put into rotating motion, the specially desired spectral ranges may be simply preselected. This is preferably achieved under computer control by means of activators which influence the filter disk drive. If the filter disk is rotated like a chopper, then it is possible, for example, to project each even numbered image with the UV filter on the first monitor, and each odd numbered image with the IR filter on a second monitor as an IR image. Through the coincidence or correspondence of known UV and IR plume signatures, the false alarm rate and the validity of the information is improved. The image processing is carried out as for the other example embodiments. The analysis is more difficult in the visible spectral range. A simple image improvement can be achieved by means of contrast enhancement, electronic filtering, etc., and for daylight applications the incident light intensity must be attenuated due to the then existing high sensitivity of the recognition system. For nighttime applications, the recognition system serves as a night vision device with the above described characteristics. The recognition system according to the invention is well suited for operative applications, depending upon the sensor make-up and a field of view which extends up to a full panoramic view. By using several sensors with a fixed field of view, which are sighted in different directions and which have only slightly overlapping fields of view, the entire space can be covered. In this context it must be taken into account that the operating range requirements of the entire system are dependent upon the resolution of the individual sensors. For an early warning system according to FIG. 2, a full panoramic view in the azimuth is made possible. The coverage in elevation at the polar caps is only conditionally given, but may also be expanded by additional sensors or expansion of the field of view of the individual sensors, if it is required by the operational application. When several sensors are used, the image processing can process the image information of the individual sensors in sequence or in parallel. When a flying body is identified in a sensor, it must be further processed at the expense of the other sensors. In order to prevent an overloading of the computing capacity of the computing capacity of the image processing, only interesting image contents of the individual sensors are conveyed further to the target tracker. The major portion of the image contents is without any flying body signature and constant in its information content and therefore does not need to be further processed. The case that a flying body attack is carried out simultaneously from opposite directions is relatively unlikely, that is to say, in other words, sufficient recognition reliability is achieved in a principle construction according to FIG. 2 or a similar embodiment if possible starting locations and approach flight directions are previously known or can be expected as a prescribed pattern, for example, to be called up from a fixed value memory which is also true for other engine parameters and flying body parameters. The approach flight angle, acceleration, or velocity and other parameters can be recognized with this sensor arrangement and evaluating arrangement. Additionally, as the case may be, a laser optical distance measurement and a friend or foe recognition, which is known as such, may be used.

Figure 7:
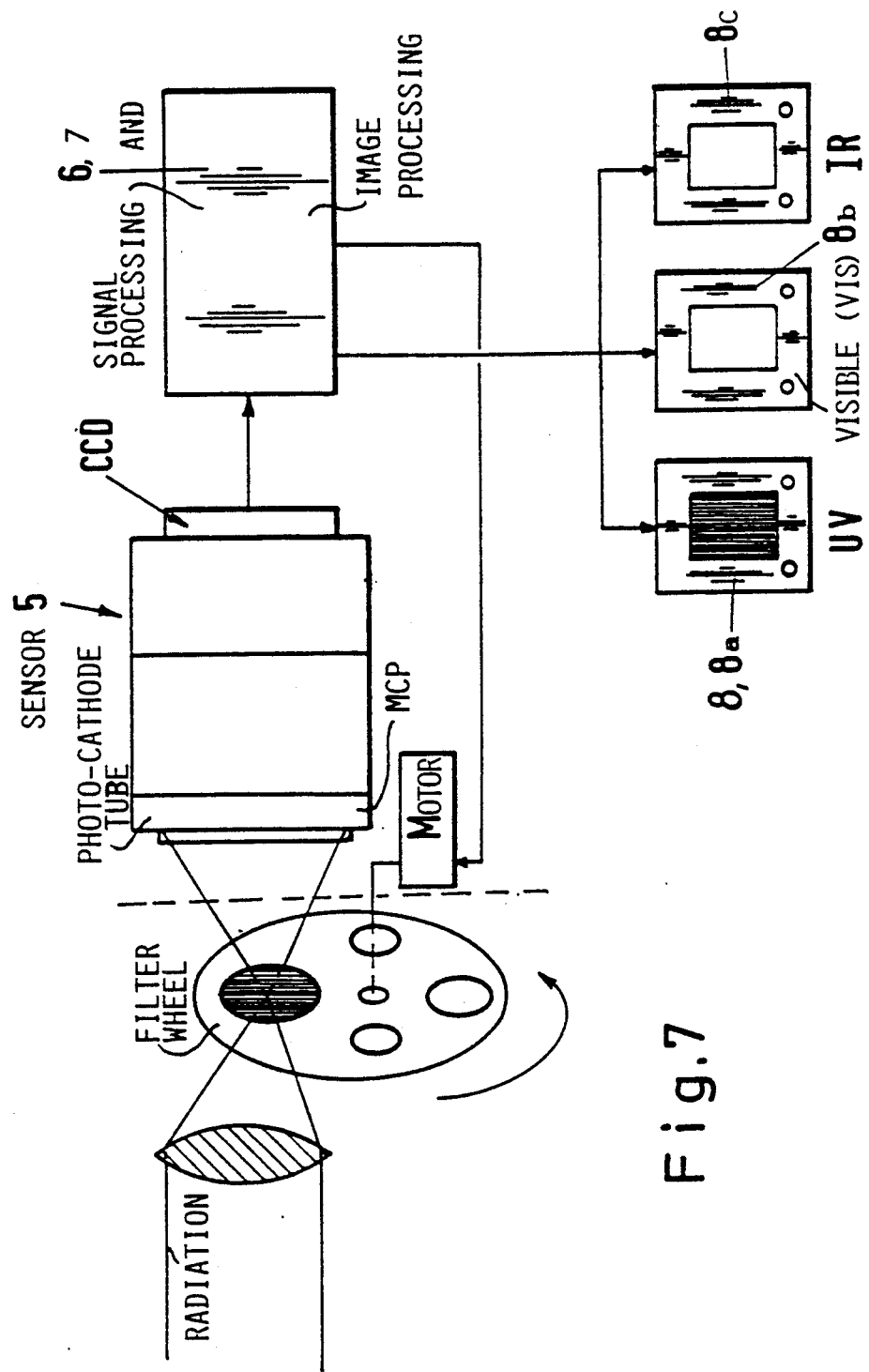
FIG. 7 shows an intelligent application of the sensor for image display in different spectral ranges.

FIG. 7 shows a recognition system with a motor, especially an electromotor, drivable filter wheel for evaluating various spectral ranges, controllable by the computer of the image processing stage 7 which is shown in a common block with the image read-out 6 and the monitors 8a, 8b, 8c.

The filter wheel rotational velocity is electrically coupled with the image read-out in such a computer aided manner that, for example, for each third image, when one relates it to three spectral ranges to be evaluated, for example the IR filter is arranged in front of the photo-cathode in the optical axis of the system.

The read-out sequence varies with the number of filter disks. This may also include a day/night evaluating mode or setting. With an intelligent evaluation, the monitor imaging is not necessary, in that the computer of the image processing stage 7 compares the image contents of various spectral ranges with previously known patterns of significant objects out of a memory. In a desired application, the camera system can be modified or appropriately adapted as a vision aid and in nighttime applications as an intelligent residual light camera.

Figure 8:
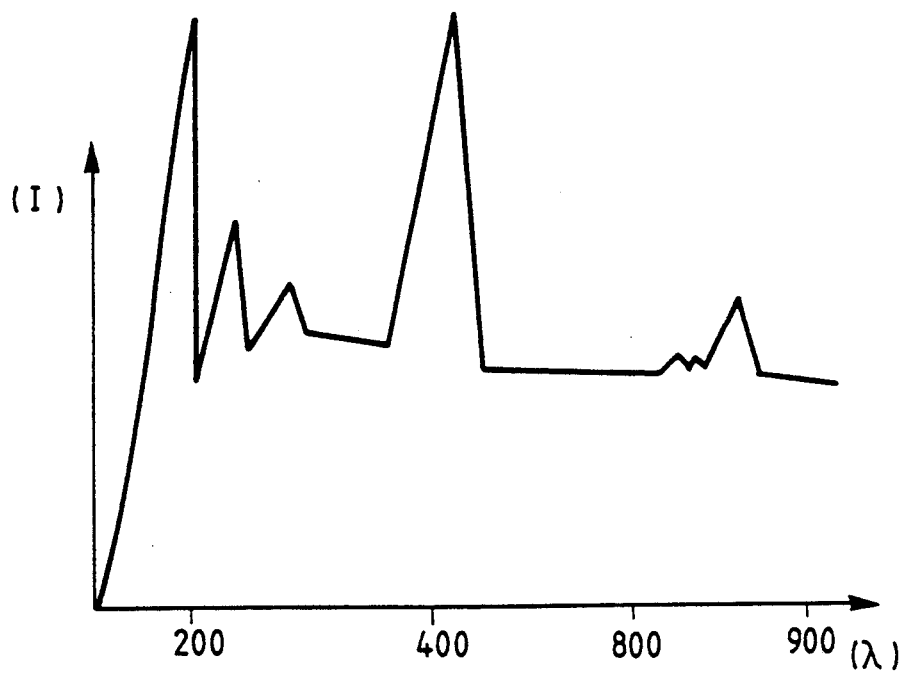
FIG. 8 shows a characteristic of the sensor sensitivity and the corresponding spectral range.

In another embodiment of the invention as shown in the FIGS. 9 to 12 and described below, a multi-spectral sensor is provided, of which the spectral sensitive ranges are given by the freely selectable transmission characteristics within a very broad range of approximately 200 to 900 nm as shown in FIG. 8, especially through the use of an optical element in front of the input optics. The spectral range which is evaluatable, is shown in FIG. 8, wherein the intensity of the radiation is shown on the ordinate and the wavelength between 200 and 900 nm is shown on the abscissa ($\lambda$). Various intensity maxima are clearly visible as they arise in scenes to be viewed.

Because the photo-sensitive part of the sensor 5 to the right in FIG. 1 and on the right of sensor 5 in FIG. 7 is embodied as a sensor and as an amplification element, especially as a photo-cathode with an integrated image amplifier, the sensor characteristics are easily adaptable with a high dynamic range to the respective conditions of a scene. In order to clarify this point, in the following a special case is chosen purely as an example for a better understanding.

The sensor 5 of FIG. 7 has a photo-cathode 50 as the photo-sensitive part, for example type S20, sensitive from approximately 200 nm to 850 nm. An image amplifier is arranged downstream of the photo-cathode tube. An image read-out takes place through CCD-sensor devices. The photo-cathode tube includes a microchannel plate MCP as shown at 30 in FIGS. 6a and 6b. The optical element arranged in front of the radiation input optics splits the image of the scene in such a manner that three identical image scenes I, II, III are imaged and displaced in parallel on the CCD-matrix, compare FIG. 12. If the optical element is additionally modified in such a manner that only one characteristic spectral range UV, VIS, IR or green/red/blue is transmitted per image component, then the same scene will be available per image field of the video image, in three different spectral ranges.

Figure 9:
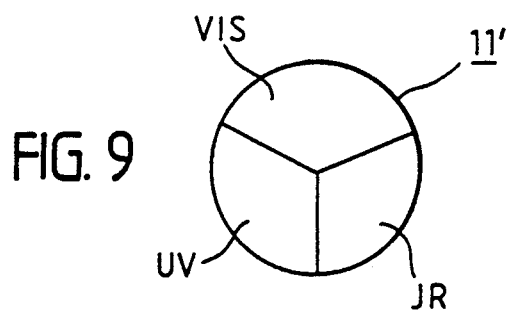
FIG. 9 shows a lens arrangement, especially a trick lens for viewing selectively determined spectral ranges.
Figure 10:
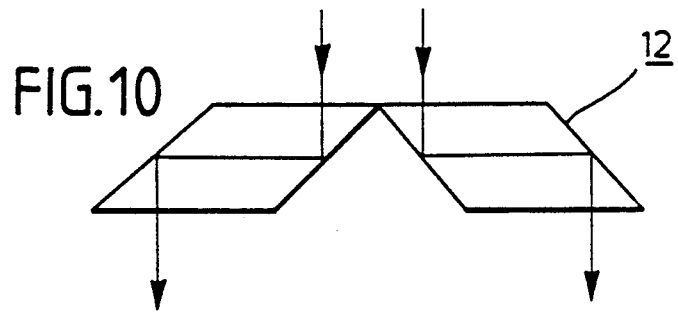
FIG. 10 shows a mirror arrangement for use with the invention, especially in the optical system of FIG. 11.
Figure 11:
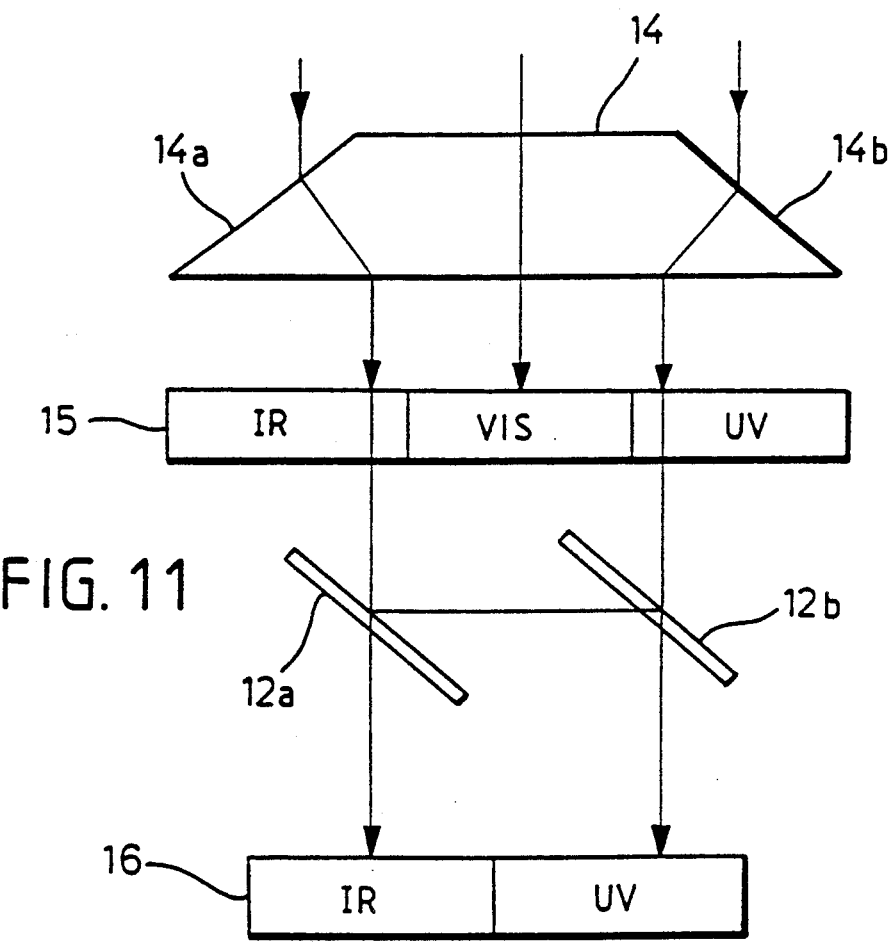
FIG. 11 is an optical system including a prism arrangement combined with a mirror arrangement.
Figure 12:
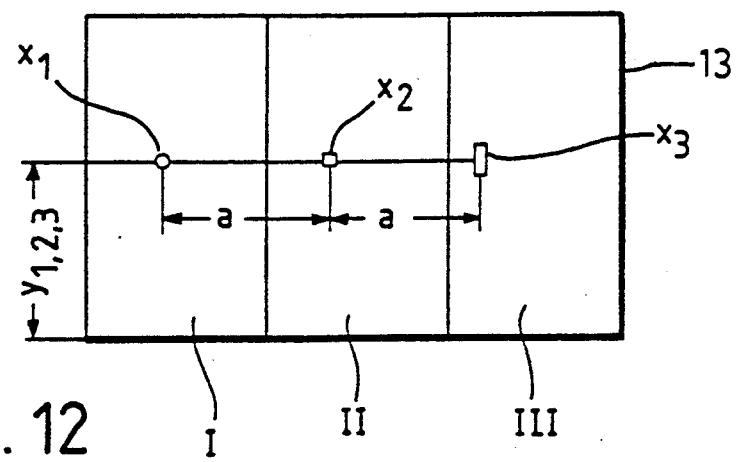
FIG. 12 illustrates an example of an image evaluation with reference to a video image.

If a special wave length is recognized as being significant for locating or ranging and recognizing an object such as a flying body, then this radiation arises as a triple light point at the same times on the video image 13 in FIG. 12 through appropriate spectral filtering in the lens or filter arrangement 11' shown in FIG. 9 and by means of mirrors 12 as shown in FIGS. 10 and 11. This results in an unambiguous location and recognition of an object by its spacings along the X- and Y-axes on the video image 13, FIG. 12 and with regard to the form of the image points which correspond to an object, see $X_1$, $X_2$, and $X_3$ in FIG. 12 with the vertical spacings $Y_1$, $Y_2$, and $Y_3$. The lateral displacements of the spacings "a" are constant among the objects.

In this embodiment a typical trick lens 11' with various types of layers may be used as is shown, for example, in FIG. 9. The ranges, here VIS, UV, IR or green/red/blue or others, may be chosen as desired, not only in sector shapes, but also with a central region. These regions can partially overlap or cover each other.

FIG. 10 shows one mirror construction 12 of the type that can be used for redirecting the light beams and selecting separate spectral ranges. The lens arrangement 11' of FIG. 9 can for example, be used instead of a rotatable filter disk or filter wheel shown in FIG. 7.

The mirror construction 12 is especially suitable for making easier special separations in the beam path as shown in FIG. 11.

In FIG. 11 a lens or prism arrangement 14 is constructed as an optical element, whereby this prism is made especially of quartz or fluoride glass or other material having similarly good optical characteristics. The laterally sloped surfaces 14a and 14b are made of different selective filter layers depending upon which spectral range is desired to be evaluated. An image generator 15 and a mirror arrangement 12a and 12b are shown below the prism 14 in FIG. 11. A selected image generator 16 is shown behind the mirror arrangement 12a, 12b in the beam path. Such optical elements as beam splitters, mirrors, filters, prisms, lenses, etc. are known as such. The image evaluation is not shown, especially a dynamic evaluation and image analysis by means of a computer. This is also true for FIG. 12, where the video image 13, for example, is produced as a computer aided image on a monitor by means of a computer which is not shown, in which also the algorithms for evaluating the image contents are stored. Only in this manner is an error free recognition of the object possible over the entire flight path.

Although the invention has been described with reference to specific example embodiments, it will be appreciated that it is intended to cover all modifications and equivalents within the scope of the appended claims.

We claim:

1. A system for recognizing the start and approach flight of a flying body, comprising ultraviolet responsive sensor means having an image sensing surface area for producing image information signals in response to a plume signature of said flying body, signal read-out means operatively connected to an output of said ultraviolet responsive sensor means for producing digital image signals from said image information signals, digital image signal processing and evaluating means including computer means and signal comparing means connected to said read-out means for producing useful signals from said digital image signals, by comprising said digital image information signals with stored signal patterns of known plume signatures in the ultraviolet range, and means connected to said digital image signal processing and evaluating means for receiving said useful signals for further use thereof.

2. The system of claim 1, wherein said ultraviolet responsive sensor means comprise surface area input optics, image converter means and image amplifier means.

3. The system of claim 2, wherein said surface area input optics have a frequency range from the UV range to the near IR range, with a high resolution.

4. The system of claim 1, wherein said sensor means comprise photo-cathode tube means, filter means and variable shutter means in front of said photo-cathode tube means as viewed in a direction of incidence, whereby said filter means and said shutter means only transmit desired spectral ranges to said signal read-out means.

5. The system of claim 4, wherein said photo-cathode tube means comprises a photo-cathode constructed to be sensitive in a spectral range of incident UV radiation.

6. The system of claim 4, further comprising an electronic interval circuit for clocking said photo-cathode tube means, and electron multiplier stage or stages for improving at least one of a signal to noise ratio and a glare protection.

7. The system of claim 1, further comprising one or more electron multiplier stages in said sensor means.

8. The system of claim 7, wherein said image read-out means are directly coupled to a last stage of said electron multiplier stages.

9. The system of claim 7, further comprising luminous screen or fiber optic means for coupling a last stage of said electron multiplier stages to said image read-out means.

10. The system of claim 1, wherein said sensor means comprises a CCD with a plurality of pixels forming said image sensing surface area.

11. The system of claim 10, further comprising clock signal means for clocking said CCD to achieve a desired time exposure and for improving at least one of a signal to noise ratio and a glare protection.

12. The system of claim 1, further comprising a UV sensitive point sensor providing an output signal for controlling in closed loop manner shutter means, filter means, and clocking means of said system.

13. The system of claim 1, further comprising clocking means for clocking within an exposure time sufficient for allowing an image succession frequency of said system.

14. The system of claim 13, wherein a simultaneous clocking of several components of said system, a sensing time duration, and a switch-on time of clocked components are tuned to each other for desired time exposures with reference to intensity, form, size and direction of a field of view.

15. The system of claim 1, further comprising additional sensor means for providing a control output signal for controlling a clocking to suppress vibrations in said system.

16. The system of claim 1, further comprising electronic zoom means responsive to a recognition of an object in a field of view, control circuit means for controlling said electronic zoom means in such a manner, that an analysis of form, brightness, size, and movement of said object can be included in a threat analysis.

17. The system of claim 1, wherein said sensor means comprise a plurality of individual sensors assembled for covering a large spacial angle to widen a field of view to a panoramic view.

18. The system of claim 1, wherein said sensor means comprise sensors which, additionally to said ultraviolet, can also detect a visible spectral range and an IR range near the visible spectral range.

19. The system of claim 1, further comprising a rotating filter wheel for a simultaneous quasi-real-time imaging of a target area in various wave length ranges, said rotating filter wheel being coupled with said signal read-out means for controlling an r.p.m. of said rotating filter wheel.

20. The system of claim 1, further comprising means for conveying output signals from said signal read-out means said computer means during image evaluation for said comparing to provide at least one of a reliable recognition and a plausibility control.

21. The system of claim 1, further comprising an optical element located in front of input optics of said ultraviolet responsive sensor means, wherein said optical element multiplies images of a viewed scene in an image field plane, whereby imaging is carried out simultaneously in another spectral window.

22. The system of claim 21, wherein said optical element comprises optical means having selective spectral transmission characteristics, whereby a viewed scene can be simultaneously imaged in a plurality of wavelength ranges.

23. The system of claim 11, wherein said digital image signal processing and evaluating means comprise an evaluating circuit in which image processing is carried out spectrally selectively, dynamically, and in real time, in that the image contents are evaluated with reference to their form, motion, dynamics, their intensity characteristic, and their spacial correlation within various spectral windows.

24. The system of claim 1, wherein said sensor means comprise an image generating CCD sensor connected to said computer means for supplying image contents to said computer means for image processing, preparing and evaluating, said computer means having evaluation algorithms stored therein for analyzing said image contents so that known plume signatures and movement characteristics lead to an unambiguous error-free locating, ranging and recognition of an entire flight path of said flying body.

* * * * *

UNITED STATES PATENT AND TRADEMARK OFFICE
CERTIFICATE OF CORRECTION

PATENT NO. : 5,001,348
DATED : March 19, 1991
INVENTOR(S) : Reinhard Dirscherl et al.

It is certified that error appears in the above-identified patent and that said Letters Patent is hereby corrected as shown below:

In claim 1, column 12, line 16, replace "comprising" by --comparing--;

In claim 20, column 13, line 33, after "means" (1st occurrence) insert --to--;

In claim 23, column 14, line 14, replace "claim 11" by --claim 1--;

In claim 23, column 14, line 19, after "motion" delete --,--.

Signed and Sealed this

Eighth Day of September, 1992

Attest:

DOUGLAS B. COMER

Attesting Officer

Acting Commissioner of Patents and Trademarks